United States Patent
Schanz et al.

(10) Patent No.: US 12,264,978 B2
(45) Date of Patent: Apr. 1, 2025

(54) DEVICE AND ARRANGEMENT FOR MEASURING LOAD ON A TEST OBJECT, IN PARTICULAR A CHASSIS COMPONENT

(71) Applicant: Trafag AG, Bubikon (CH)

(72) Inventors: Christoph Schanz, Frickenhausen (DE); Philipp Cörlin, Unterensingen (DE); Philippe Klemm, Unterensingen (DE)

(73) Assignee: Trafag AG, Bubikon (CH)

( * ) Notice: Subject to any disclaimer, the term of this patent is extended or adjusted under 35 U.S.C. 154(b) by 483 days.

(21) Appl. No.: 17/601,239

(22) PCT Filed: Mar. 17, 2020

(86) PCT No.: PCT/EP2020/057337
§ 371 (c)(1),
(2) Date: Oct. 4, 2021

(87) PCT Pub. No.: WO2020/200775
PCT Pub. Date: Oct. 8, 2020

(65) Prior Publication Data
US 2022/0170802 A1 Jun. 2, 2022

(30) Foreign Application Priority Data
Apr. 4, 2019 (DE) ...................... 10 2019 108 898.4

(51) Int. Cl.
*G01L 1/12* (2006.01)
*G01L 1/26* (2006.01)
*G01M 17/007* (2006.01)

(52) U.S. Cl.
CPC ................ *G01L 1/127* (2013.01); *G01L 1/26* (2013.01); *G01M 17/007* (2013.01)

(58) Field of Classification Search
CPC . H10N 35/101; G01L 1/12–127; G01L 3/102; G01L 3/104; G01L 3/105; G01B 7/24
See application file for complete search history.

(56) References Cited

U.S. PATENT DOCUMENTS

| 3,011,340 A | 12/1961 | Dahle |
| 3,311,818 A | 3/1967 | Quittner |

(Continued)

FOREIGN PATENT DOCUMENTS

| DE | 3031997 A1 | 3/1982 |
| DE | 10 2017 111 055 B3 | 9/2018 |

(Continued)

OTHER PUBLICATIONS

Hinz and Voigt, "Magnetoelastic Sensors," Sensors: A Comprehensive Survey, vol. 5, VCH Verlagsgesellschaft mbH VCH Publishers Inc., 1989.

*Primary Examiner* — Tran M. Tran
(74) *Attorney, Agent, or Firm* — United One Law Group LLC; Kongsik Kim; Jhongwoo Peck

(57) ABSTRACT

The invention relates to a load measurement device (12) for accurately measuring a load in a test object (14) such as, in particular, a chassis component, comprising a magnetic field generating device (18), a first magnetic field detecting device (20), a second magnetic field detecting device (22), and a measurement environment parameter acquisition device (80) for acquiring at least one measurement environment parameter in the test object (14), wherein an evaluation device (42) is configured to generate a measurement signal obtained on the basis of outputs of the first and second magnetic field detection devices (20, 22) in dependence on the at least one measurement environment parameter detected by the measurement environment parameter acquisition device (80).

14 Claims, 4 Drawing Sheets

(56) References Cited

U.S. PATENT DOCUMENTS

Figure 1:
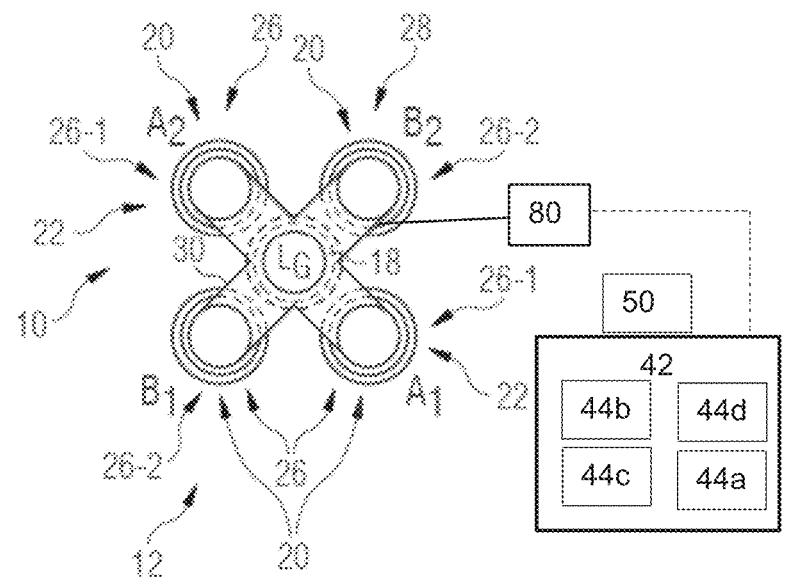

| | | | | |
|---|---|---|---|---|
| 3,903,739 | A * | 9/1975 | Kolavcic | G01L 1/127 |
| | | | | 336/20 |
| 4,135,391 | A | 1/1979 | Dahle | |
| 5,542,304 | A * | 8/1996 | Sasada | B23Q 17/09 |
| | | | | 73/862.06 |
| 6,487,925 | B2 * | 12/2002 | Fischer | C23G 3/023 |
| | | | | 74/337 |
| 8,058,865 | B2 * | 11/2011 | May | G01D 5/2046 |
| | | | | 324/207.16 |
| 9,234,811 | B2 * | 1/2016 | Brummel | G01L 3/105 |
| 9,347,845 | B2 * | 5/2016 | Gießibl | F16C 11/06 |
| 9,618,408 | B2 * | 4/2017 | Lu | G01L 3/102 |
| 9,645,022 | B2 * | 5/2017 | Brummel | G01L 3/105 |
| 9,671,214 | B2 * | 6/2017 | Ausserlechner | G01D 5/145 |
| 10,006,932 | B2 * | 6/2018 | White | G01P 21/02 |
| 10,247,627 | B2 * | 4/2019 | May | G01L 3/101 |
| 10,359,324 | B2 * | 7/2019 | Sipilä | H01F 27/2804 |
| 10,415,997 | B2 * | 9/2019 | Huber Lindenberger | |
| | | | | G01D 3/06 |
| 10,444,096 | B2 * | 10/2019 | May | G01L 1/142 |
| 10,473,536 | B2 * | 11/2019 | Lu | G01B 7/14 |
| 10,663,363 | B2 * | 5/2020 | Lu | G01L 3/102 |
| 10,782,116 | B2 * | 9/2020 | Ausserlechner | G01B 7/30 |
| 10,955,493 | B2 * | 3/2021 | Sharma | G01R 33/0035 |
| 10,962,433 | B2 * | 3/2021 | Schanz | G01L 9/007 |
| 11,022,508 | B2 * | 6/2021 | Doelling | G01L 3/105 |
| 11,099,086 | B2 * | 8/2021 | Lu | G01L 3/102 |
| 11,402,237 | B2 * | 8/2022 | Buchenau | G01D 5/22 |
| 11,422,048 | B2 * | 8/2022 | Schanz | G01L 5/0019 |
| 11,585,708 | B2 * | 2/2023 | Schanz | G01L 3/105 |
| 11,592,280 | B2 * | 2/2023 | Margner et al. | G01D 5/24495 |
| 11,821,804 | B2 * | 11/2023 | Ettenauer | G01L 25/003 |
| 2014/0165737 | A1 * | 6/2014 | Brummel | G01L 1/12 |
| | | | | 73/779 |
| 2017/0211996 | A1 * | 7/2017 | Lu | G01L 3/102 |
| 2018/0245994 | A1 * | 8/2018 | May | G01L 25/00 |
| 2018/0266897 | A1 * | 9/2018 | May | G01L 1/127 |
| 2019/0187008 | A1 * | 6/2019 | Schanz | G01L 3/105 |
| 2019/0219458 | A1 * | 7/2019 | May | G01L 1/127 |
| 2019/0323907 | A1 * | 10/2019 | Lu | G01L 3/105 |
| 2020/0158538 | A1 * | 5/2020 | Buchenau | G01B 7/14 |
| 2023/0258684 | A1 * | 8/2023 | Huber | G01P 13/045 |
| | | | | 324/174 |

FOREIGN PATENT DOCUMENTS

| | | | | |
|---|---|---|---|---|
| EP | 0 384 042 | A2 | 8/1990 | |
| EP | 2833109 | A1 * | 2/2015 | G01L 1/125 |
| EP | 3 051 265 | A1 | 8/2016 | |

* cited by examiner

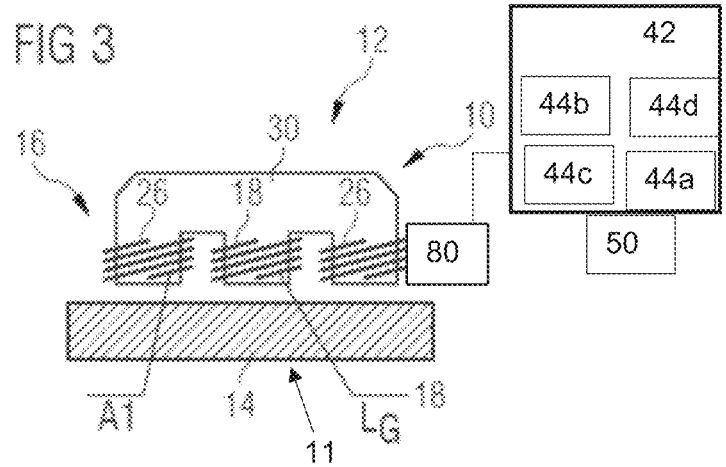
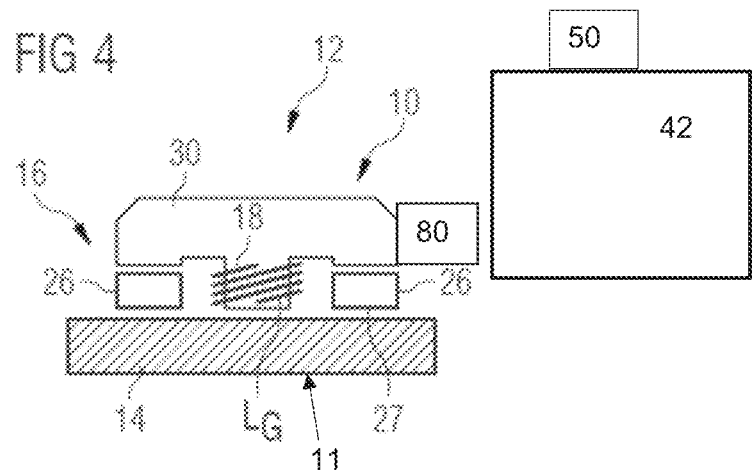
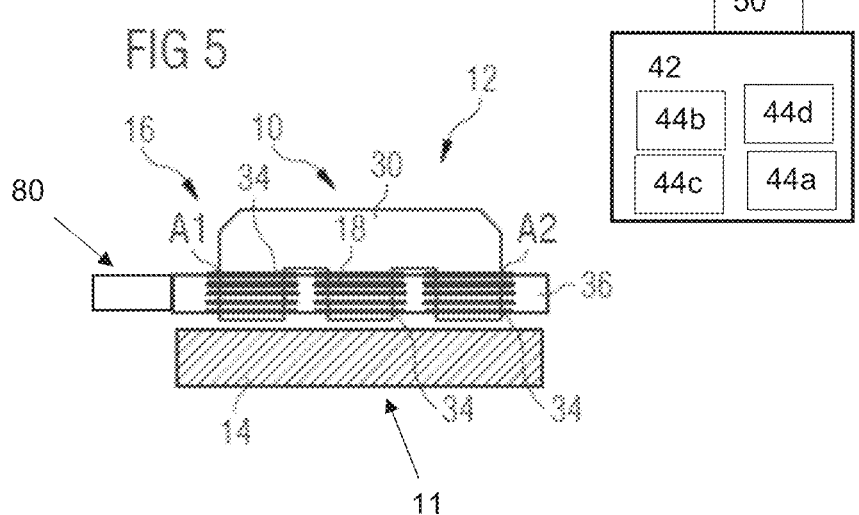

DEVICE AND ARRANGEMENT FOR MEASURING LOAD ON A TEST OBJECT, IN PARTICULAR A CHASSIS COMPONENT

CROSS-REFERENCE TO RELATED APPLICATIONS

This application is a National Stage Entry of International Application PCT/EP2020/057337 filed on Mar. 17, 2020, which claims priority to German Application 10 2019 108 898.4 filed on Apr. 4, 2019. The aforementioned applications are incorporated herein by reference in their entireties.

The invention relates to a load measurement device and a load measurement arrangement for measuring a load in a test object. In particular, the invention is intended to be used for load measurement on chassis parts of vehicle chassis.

The invention relates in particular to a device for measuring a mechanical load in a test object. In this context, loads are understood to be forces, torques or mechanical stresses in the test object.

Some exemplary embodiments of the invention relate in particular to a torque measuring device for measuring a torque or a force in a test object in the form of a shaft or a chassis component while detecting changes in the magnetic field. A load cell, a load sensor, and a load measurement method are particularly designed for detecting changes in the magnetic field based on the Villari effect and even more particularly for magnetoelastic (=inverse magnetorestrictive) detection of loads, such as in particular torques or forces or mechanical stresses.

Such load sensors that detect loads in test objects such as shafts in particular, based on changes in the magnetic field, and the relevant scientific background are described in the following literature:
- D1 Gerhard Hinz and Heinz Voigt "Magnoelastic Sensors" in "Sensors", VCH Verlagsgesellschaft mbH, 1989, Seiten 97-152
- D2 U.S. Pat. No. 3,311,818
- D3 EP 0 384 042 A2
- D4 DE 30 31 997 A
- D5 U.S. Pat. No. 3,011,340 A
- D6 U.S. Pat. No. 4,135,391 A One design of torque transducers as described in D4 (DE 30 31 997 A1) has proven to be particularly effective in measuring torques in shafts and at other measuring points.

It is known that the physical measured values: torque, force and position in ferromagnetic objects can be determined applying magnetic measurement methods. Usually, magnetoelastic (or also inversely magnetorestrictive) sensors or eddy current sensors are used for this purpose. The ferromagnetic materials that are used change their permeability under the influence of tensile or compressive stresses (also called Villari effect). In practice, it is usually difficult to distinguish between the individual effects; only the eddy current sensor is easier to distinguish from the other effects due to its frequency dependence. In addition, the state of magnetization of the object is often not known or is strongly influenced by the processing and handling of the objects so that a broad industrial application is often difficult. In addition, it is frequently not possible to predict the service life of the magnetized objects under the often quite harsh environmental conditions in which this technology is used (for example but not exclusively in the field of electromobility, especially E-bikes, e.g. pedelecs, in heavy industry, in gearboxes, in hydraulic systems of construction machinery or in agricultural equipment).

From
- D7 EP 3'051'265 A1 it is known to compensate this disadvantage by active magnetization by means of an alternating magnetic field in the kHz range. Generator and detector coils are used for this purpose, namely two first magnetic field detector coils A1, A2 and two second magnetic field detector coils B1, B2 and a central magnetic field generating coil Lg in a cross arrangement (X-arrangement). The difference of the coil pair A−B=(A1+A2)−(B1+B2) is determined in an analog signal processing scheme.

One problem occurring at the use of such load measurement devices in practice arises from the fact that the measurement conditions can constantly change particularly for test objects installed in vehicles, which makes the measurement difficult during the operation of vehicles or other objects to be used in different environments and can lead to inaccuracies. For example, in active or passive chassis components as a test object in which a load is to be measured, the position of the test object relative to vehicle body parts or motor parts, live wires or heat sources can constantly change so that changes in ambient magnetic fields and in temperature can occur and can lead to measurement errors.

It is an object of the present invention to provide devices allowing to further reduce a measurement error caused by different operating conditions during load measurement by means of active magnetization.

To solve this object, the invention provides devices and arrangements according to the independent claims.

Advantageous embodiments are the subject of the subclaims.

According to one aspect, the invention provides a load measurement method for measuring a load in a test object, comprising:
- a sensor head,
- a magnetic field generating device for generating a magnetic field in the test object, the magnetic field generating device comprising a magnetic field generating coil arranged on the sensor head and a power source to supply the magnetic field generating coil with a periodically alternating current;
- a first magnetic field detecting device arranged on the sensor head for detecting a first magnetic field parameter which changes on the basis of a load in the test object and for generating a first magnetic field parameter signal which changes periodically on the basis of the periodically generated magnetic field,
- a second magnetic field detecting device arranged on the sensor head for detecting a second magnetic field parameter which changes on the basis of a load in the test object and for generating a second magnetic field parameter signal which changes periodically on the basis of the periodically generated magnetic field,
- an evaluation device for generating a measurement signal from the first and second magnetic field parameter signals, and
- a measurement environment parameter acquisition device for acquiring at least one measurement environment parameter in the test object,
- wherein the evaluation device is configured to generate the measurement signal in dependence of the at least one measurement environment parameter acquired by the measurement environment parameter acquisition device.

It is preferred that the measurement environment parameter acquisition device comprises a current sensor for detecting the amperage of the current flowing in the magnetic field generating coil.

It is preferred that the measurement environment parameter acquisition device comprises an inductance sensor for detecting the inductance of the magnetic field generating coil.

It is preferred that the measurement environment parameter acquisition device comprises a magnetic field sensor for detecting a uniform magnetic field or a magnetic field changing at a lower frequency compared to the periodically generated magnetic field.

It is preferred that the measurement environment parameter acquisition device comprises an acceleration sensor for detecting an acceleration applied to the sensor head and/or the test object.

It is preferred that the measurement environment parameter acquisition device comprises a temperature sensor for detecting the temperature of the test object and/or for detecting a temperature difference between the test object and the sensor head.

It is preferred that the evaluation device is configured to detect a change in the inductance of the magnetic field generating coil on the basis of a change in the amperage measured by the current sensor and/or a change in the permeability of the test object and to correct the measurement signal on the basis of this change.

It is preferred that the evaluation device is configured to correct the measurement signal on the basis of a change in the inductance of the magnetic field generating coil measured by the inductance sensor.

It is preferred that the evaluation device is configured to detect a change in the permeability of the test object from a change in the inductance of the magnetic field generating coil measured by the inductance sensor and to correct the measurement signal on the basis on this change.

It is preferred that the evaluation device is configured to detect a change in ambient magnetic fields on the basis of a magnetic field sensor signal of the magnetic field sensor and to correct the measurement signal on the basis of this change in the ambient magnetic fields.

It is preferred that the evaluation device is configured to detect shocks or loads from outside on the basis of acceleration detected by the acceleration sensor and to correct the measurement signal based on this.

It is preferred that the evaluation device is configured to correct the measurement signal on the basis of the temperature of the test object measured by the temperature sensor.

It is preferred that the evaluation device is configured to correct the measurement signal based on the temperature difference between the test object and the sensor head measured by the temperature sensor.

It is preferred that a first pair of a first magnetic field detecting device and a second magnetic field detecting device A1, B1 and a second pair of a first magnetic field detecting device and a second magnetic field detecting device A2, B2 are provided, wherein the first and the second magnetic field detecting devices A1, B1, A2, B2 are provided in an X-shaped arrangement in such a manner that the first magnetic field detecting devices are opposite each other and the second magnetic field detecting devices are opposite each other, wherein each of the magnetic field detecting devices is associated with an analog-digital converter so that a first to fourth digital magnetic field detection signal are supplied to the evaluation device, wherein the evaluation device is configured to produce therefrom a first measurement signal and a different second measurement signal.

It is preferred that the evaluation device is configured to evaluate the first pair and the second pair separate from each other to produce the first and the second measurement signal.

It is preferred that the evaluation device is configured to evaluate the first pair by a measurement A1–B1 and A1 and the second pair by a measurement A2–B2 and A2.

It is preferred that the load measurement device, in particular the sensor head, comprises a shield against electromagnetic interference in the environment.

According to a further aspect, the invention provides a load measurement arrangement comprising a test object and a load measurement device according to any of the preceding claims for non-contact load measurement in the test object.

It is preferred that several sensor heads are disposed in diametrically opposed positions on the test object and/or annularly around the test object.

It is preferred that the test object has a cavity at at least one measuring area, the at least one sensor head being arranged in said cavity, surrounded by the test object.

The test object preferably is a test object that is rotatable about an axis of rotation, such as a shaft, a gear wheel, a toothed wheel or the like. As an alternative, the test object can be a stationary element, such as a strut, a support, a pull or push rod or a membrane, e.g. of a pressure sensor. Particularly preferred, the test object is a component of a vehicle, even more particularly a component of a chassis of a vehicle, such as for example a part of an active or passive chassis component.

For example, embodiments of the invention are suitable for measuring a torque in a section of a chassis component, such as an arm of a roll stabilizer or a steering gearbox. Particularly in the case of active chassis components, also actuators, e.g. in the form of servomotors, can be provided in close proximity where driving the actuators causes electromagnetic interference, which causes a change in the magnetic environment and thus causes measurement errors. Different temperatures, which can prevail at different chassis parts and sensors during driving, can also cause measurement errors. Further, during operation, chassis components are in motion relative to metallic other components of a vehicle, e.g. the body, so that different electric and magnetic fields can also occur here, which could lead to measurement errors.

Embodiments of the invention provide a measuring device for measuring loads which is suitable in particular for chassis components or other test objects in vehicles or other objects to be operated in different ambient conditions, and which provides more reliable measured values despite the different operating conditions.

Preferably, the load measurement device is designed in such a way that at least one sensor head or preferably more sensor heads can be employed.

In a preferred embodiment, the test object is sleeve-shaped or tubular, and the at least one sensor head is disposed in the interior of the sleeve-shaped or tubular test object and/or is surrounded by the test object.

In this manner, the sensor head is already protected against external influences by the test object. In addition, external fields can be at least partially shielded by the test object.

In a preferred embodiment, an opposed arrangement of sensor heads is provided. Preferably, an opposed arrangement of sensor heads is provided inside the sleeve-shaped test object. This has the advantage that one sensor points in one direction—e.g. towards the road—and the other in the other direction—e.g. the car body. In the event of stone chipping or other impact on the test object (e.g. the sleeve on a roll stabilizer or a steering system etc.), signals from different sensor heads could be compared with each other, for example, even when a test object is cooled by splash water. The sensor heads could also be disposed in an annular pattern. Preferably, an annular arrangement, particularly a uniformly distributed arrangement, around the complete inner circumference of a sleeve forming the test object is provided. An annular arrangement offers the greatest possible integration over the entire circumference.

In the case of an arrangement on a roll stabilizer, a load measurement device designed, for example, as a torque sensor could also be attached to one of the arms (outside the sleeve) or to an outer sleeve of the roll stabilizer, and the signals are led to the inside via the cable.

It would also be conceivable to provide at least one sensor head or load measurement device at several points or on different sides of a chassis component. The signals from the sensor heads/load measurement devices could then be checked for plausibility against each other.

For example, a torque sensor could be provided on each arm of a roll stabilizer so that the two torques of the arms could be checked for plausibility against each other.

According to one embodiment, the load measurement device is designed to operate a 5-leg sensor head (cross arrangement or X-arrangement) with four AD transducers to perform separate evaluation of coil pairs A1 and B1 (by measuring A1−B1 and A1) and A2 and B2 (by measuring A2−B2 and A2). This provides increased safety to meet ASIL-B requirements.

In another embodiment, the load measurement device is configured to measure generator current or directly measure generator inductance to detect a change in generator inductance or a change in permeability of the test object material (aging, temperature effects, etc.).

According to a further advantageous embodiment, the one or more sensor heads include a shield to protect them against the occurrence of a large electromagnetic interference, for example due to operation of an actuator.

In a further advantageous embodiment, a magnetic field sensor, e.g. Hall sensor or GMR sensor, is also implemented. The magnetic field sensor is designed to detect a change in the DC frame conditions. For example, when mounted in an automotive shop, a lamp with bar magnet could be attached to a chassis component where a load is to be measured. This can leave a residual magnetization that can potentially interfere with the load measurement device. Another interference could occur if cables carrying large currents are run along the outside of the test object, so that the resulting magnetic field could potentially be applied to the test object, or could also penetrate a sleeve of the test object within which the sensor head is located and interfere with the sensor head.

In another advantageous embodiment, a 3-axis accelerometer (MEMS sensor) is implemented in the load measurement device, the signal of which can be used to correlate fast accelerations with the measurement signal. This information can be used when, for example, stone chipping or an impact generate very fast and high torque information that needs to be intercepted.

In another advantageous embodiment, an IR sensor is implemented in the load measurement device. This can be used to directly measure the temperature of the test object, for example a roll stabilizer sleeve. If the thermal difference between the test object and the sensor is too large, this can lead to larger offset and gain errors of the load measurement device, which can be intercepted by the information of the temperature difference.

Figure 2:
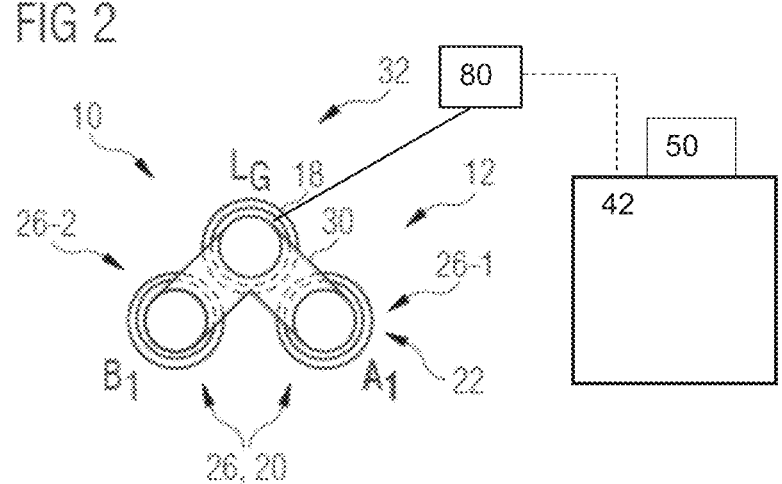
Figure 6:
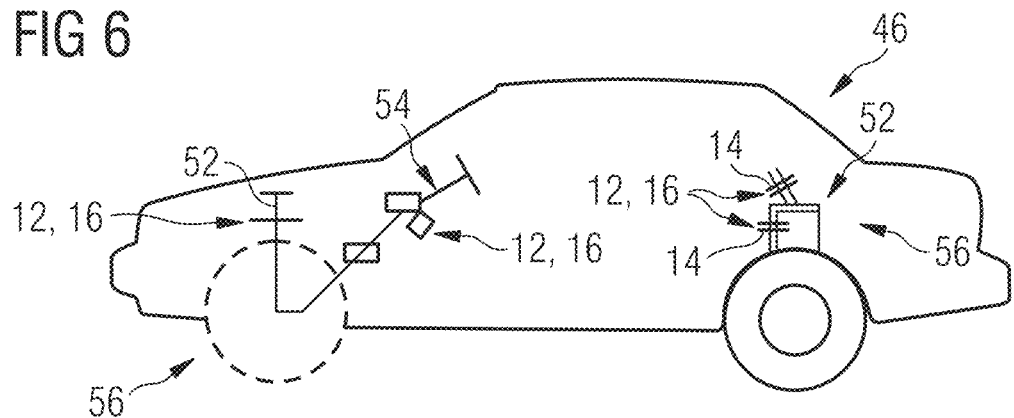
Figure 7:
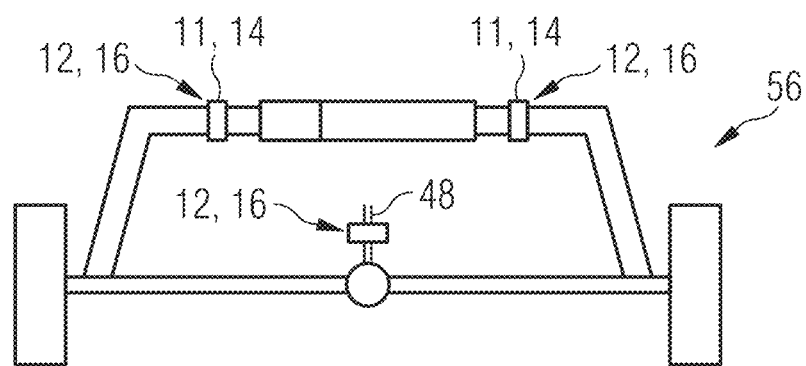
Figure 8:
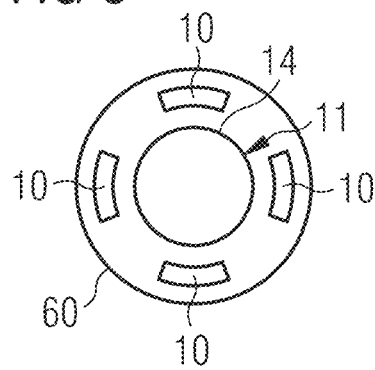
Figure 9:
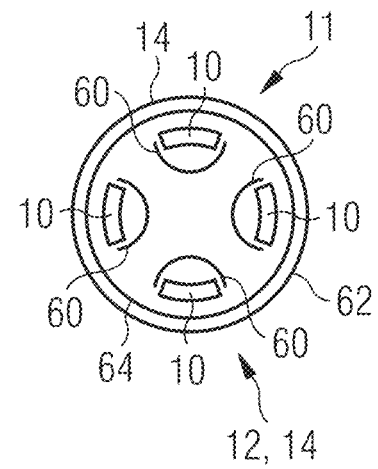
Figure 10:
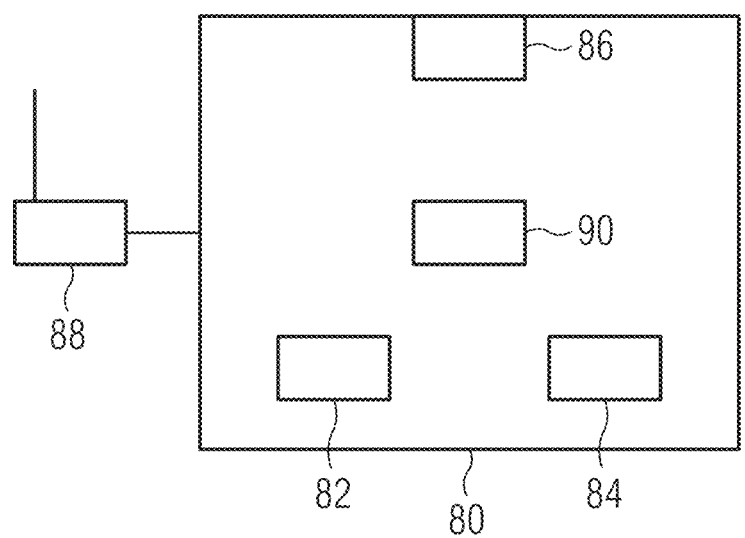

Exemplary embodiments are discussed in more detail below with reference to the accompanying drawings in which it is shown by:

FIG. 1 a first preferred embodiment of a sensor head of a load measurement device for measuring a mechanical load, such as in particular force, stress or torque in a test object;

FIG. 2 a second preferred embodiment of the sensor head;

FIG. 3 a side view of the sensor head of FIG. 1 together with the test object;

FIG. 4 a view comparable to FIG. 3 of a further embodiment of the sensor head;

FIG. 5 a view comparable to FIG. 3 of still another embodiment of the sensor head;

FIG. 6 a schematic representation of a vehicle with steering system components and chassis components as examples of test objects in which a load is to be measured;

FIG. 7 a greatly simplified representation of a drive axle of the vehicle with components as further examples of test objects;

FIG. 8 a section through a test object with an outer arrangement of sensor heads around the test object;

FIG. 9 a section through a sleeve-shaped test object with an inner arrangement of sensor heads distributed around the inner circumference of the test object; and FIG. 10 a schematic block diagram of an embodiment of a measurement environment parameter acquisition device.

FIGS. 1 to 5 show various embodiments of sensor heads 10 for a load measurement device 12. The load measurement device 12 is used to measure mechanical loads, such as in particular torques, forces or stresses, in an at least partially magnetizable test object 14, which is preferably rotatable about an axis of rotation, such as a shaft, a transmission part, a wheel hub, a chain ring, a chassis component of a vehicle or the like. In other embodiments, the test object 14 may also be stationary, such as a beam or strut in a support structure where loads or forces are to be measured. The test object 14 is at least partially formed of a ferromagnetic material at least at a measurement area 11. The test object 14 and the load measurement device 12 together form a load measurement arrangement 16.

The load measurement device 12 comprises a magnetic field generating device 18 and a plurality of magnetic field detecting devices 20, 22.

Further, the load measurement device 12 comprises an evaluation device 42. The evaluation device 42 is connected to the magnetic field detecting devices 20, 22 to generate at least one measurement signal indicating the load on the basis of the signals of the magnetic field detecting devices 20, 22.

Further, the load measurement device 12 comprises a measurement environment parameter acquisition device 80 for measuring a measurement environment parameter. The evaluation device 42 is adapted to generate the at least one measurement signal in response to the acquired measurement environment parameter.

The magnetic field generating device 18 comprises a magnetic field generating coil Lg and a driving circuit 50 for driving the magnetic field generating coil Lg. The driving circuit 50 supplies the magnetic field generating coil Lg (also referred to as the primary coil or generator coil) with a periodically alternating current, for example, a square-wave current, sine-wave current, sawtooth current, or the like, varying with a predetermined frequency f and thus a predetermined period T=1/f. For example, the frequency is in the range of 1 KHz to 200 kHz.

The magnetic field detecting devices 20, 22 have magnetic field sensors 26 in the form of detector coils A1, A2, B1, B2 (also called measuring coils or secondary coils) or solid-state magnetic field sensors 27, and the evaluation device 42 for evaluating the signals from the magnetic field sensors 26.

The embodiment of the sensor head 10 shown in FIG. 1 facing the front side to be directed to the test object 14 is shown in FIG. 3 from the side. This embodiment has two first magnetic field sensors 26-1 formed as first and second detector coils A1, A2, and two second magnetic field sensors 26-2 formed as third and fourth detector coils B1, B2. The detector coils A1, A2, B1, B2 are provided in a cross-shaped arrangement or X-arrangement 28 on a common flux concentrator 30 made of ferromagnetic material. In this case, the magnetic field generation coil Lg is provided centrally—here also on a corresponding projection of the flux concentrator 30—with the first detector coils A1 and A2 opposing each other and the second detector coils B1 and B2 opposing each other.

FIG. 2 shows another embodiment of the sensor head 10 with a V-arrangement 32, where only one first magnetic field sensor 26-1—e.g. the first detector coil A1—and only one second magnetic field sensor 26-1 are provided arranged at an angle to each other, with the magnetic field generating coil Lg at the tip of the angular configuration.

Although embodiments of the sensor head 10 with flux concentrator 30 are shown herein, the flux concentrator is omitted in particularly preferred embodiments. This works particularly well at higher driver frequencies. Omitting the flux concentrator saves material and weight; in particular, the use of different materials that can react differently to external influences, which can cause measurement errors, is avoided. Accordingly, preferred embodiments of the sensor head 10 are designed without a flux concentrator.

As FIG. 4 shows, instead of detector coils, solid-state magnetic field sensors 27 can also be provided as first and second magnetic field sensors 26-1, 26-2.

FIG. 5 shows an embodiment of the sensor head 10 in which the coils—detector coils A1, A2, B1, B2 and magnetic field generation coil Lg—are provided as planar coils 34 in a printed circuit board element 36—e.g. designed as PCB boards. Here the flux concentrator 30 is still shown, other designs of this embodiment of the sensor head 10 comprise the PCB element 36 without flux concentrator.

As described in the various literature D1-D7, the magnetic field sensors 26-1, 26-2 provide a magnetic field parameter signal that depends on the load in the test object 14. For example, in the X-arrangement 28 (corresponding to a double V-arrangement), the magnetic field parameter signal is processed from the signals of the detector coils A1, A2, B1, and B2 as described in D7 to determine the difference of the coil pair A-B as the magnetic field parameter signal.

The magnetic field parameter signal follows the periodic variation of the excitation current imposed on the magnetic field generating coil Lg with a phase shift.

In a particularly preferred embodiment, the evaluation device 42 has a separate A-D converter 44a to 44d for each detector coil A1, A2, B1, B2 in the X arrangement, so that the signals from the detector coils A1, A2, B1, B2 can be processed as digital signals. Thus, a first pair of detector coils arranged in V-arrangement—the first detector coil A1 and the third detector coil B1—and a second pair of detector coils arranged in V-arrangement—the second detector coil A2 and the fourth detector coil B2—can be evaluated separately in a particularly simple manner. For example, a difference of the signals of the first and third detector coils A1-B1 and the signal of the first detector coil A1 are compared with each other or processed together to form a first measurement signal; and a difference of the signals of the second detector coil and the fourth detector coil A2-B2 and the signal of the second detector coil A2 are compared with each other or processed together to form a second measurement signal. Thus, there are two measurement signals acquired by completely separate detector coils, so that redundancy is given.

The load measurement arrangement 16 is provided in particular in a vehicle 46, as shown schematically in FIG. 6, in order to measure loads, in particular torques or forces in vehicle parts, such as particularly in shafts 48, chassis components 52 or steering system components 54 (examples of test objects 14).

In FIG. 7, an axle 56 of the vehicle 46 is shown with an active chassis component 52, for example a roll stabilizer, and a drive shaft 48, wherein a measuring area 11 is formed at partial areas of the chassis component 52 and the drive shaft 48, respectively.

As shown in FIG. 8, the test object 14 can be surrounded by an arrangement of sensor heads 10, for example. In this case, a shield 60 is provided on the outside.

In the embodiment shown in FIG. 9, the test object 14 is formed as a sleeve 62 at least at the measuring area 11, wherein an arrangement of sensor heads 10 is provided distributed on the inner circumference inside the sleeve 62. Further, shields 60 are provided for the individual sensor heads 10 for shielding electric or magnetic fields.

In general, in particularly preferred embodiments of the load measurement arrangement 16, at least one sensor head 10 is provided in a cavity 64 of the test object 14 and the measurement is performed from the inside to the outside.

FIG. 10 shows a block diagram of an embodiment of the measurement environment parameter acquisition device 80. In particular, the measurement environment parameter acquisition device 80 is arranged on the sensor head 10 or in or on a sensor housing (not shown) accommodating the sensor head 10. In the example of FIG. 5, the measurement environment parameter acquisition device 80 may be part of the circuit board element 36.

As shown in FIG. 10, the measurement environment parameter acquisition device 80 comprises at least one sensor 82, 84, 86, 90. The sensor or sensors are, for example, an acceleration sensor 82, in particular a 3D acceleration sensor, for detecting shocks or vibrations, a temperature sensor 84, in particular an infrared sensor, for detecting a temperature of the test object 14 and, in particular, a temperature difference between the test object 14 and the sensor head 10 or the sensor housing, a magnetic sensor 86 for detecting a static magnetic field or a magnetic field that changes at a frequency that is substantially lower (i.e., by at least one or more orders of magnitude) than the frequency of the drive circuit 50, a current sensor 88 for measuring the current of the magnetic field generating coil Lg, and/or an inductance sensor 90 for directly measuring the inductance of the magnetic field generating coil Lg.

The evaluation device 42 is arranged to correct the at least one measurement signal on the basis of the measurements of the measurement environment parameter acquisition device 80.

For example, when the magnetic sensor 86 indicates a change in the static magnetic field environment, for example caused by an external magnetic field, the measurement signal can be corrected accordingly.

For example, for correction, a characteristic map can be generated for the concrete load measurement arrangement per signal of a sensor of the measurement environment parameter acquisition device 80 in experiments, which is used for correction.

LIST OF REFERENCE SIGNS 10 sensor head
11 measuring area
12 load measurement device
14 test object
16 load measurement arrangement
18 magnetic field generating device
20 first magnetic field generating device
22 second magnetic field generating device
26 magnetic field sensor
26-1 first magnetic field sensor
26-2 second magnetic field sensor
27 solid-state magnetic field sensor
28 X-arrangement
30 flux concentrator
32 V-arrangement
34 planar coil
36 circuit board element
42 evaluation device
44a first A-D converter (for first detector coil A1)
44b second A-D converter (for second detector coil A2)
44c third A-D converter (for third detector coil B1)
44d fourth A-D converter (for fourth detector coil B2
46 vehicle
48 shaft
50 drive circuit
52 chassis component
54 steering system component
56 axle
60 shield
62 sleeve
64 cavity
80 measurement environment parameter acquisition device
82 acceleration sensor
84 temperature sensor
86 magnetic sensor
88 current sensor
90 inductance sensor
A1 first detector coil
A2 second detector coil
B1 third detector coil
B2 fourth detector coil
Lg magnetic field generating coil

The invention claimed is:

1. A load measurement device (12) for measuring a load in a test object (14), comprising:
a sensor head;
a magnetic field generating device (18) for generating a magnetic field in the test object (14), the magnetic field generating device (18) comprising a magnetic field generating coil (Lg) arranged on the sensor head and a current source for supplying the magnetic field generating coil (Lg) with a periodically alternating current;
a first magnetic field detecting device (20) for detecting a first magnetic field parameter which changes on the basis of a load in the test object (14) and for generating a first magnetic field parameter signal which changes periodically on the basis of the periodically generated magnetic field, said first magnetic field detecting device (20) comprising at least one first magnetic field sensor (26-1) arranged on the sensor head (10);
a second magnetic field detecting device (22) for detecting a second magnetic field parameter which changes on the basis of a load in the test object (14) and for generating a second magnetic field parameter signal which changes periodically on the basis of the periodically generated magnetic field, said second magnetic field detecting device (22) comprising at least one second magnetic field sensor (26-2) arranged on the sensor head (10);
an evaluation device (42) for generating a measurement signal from the first and the second magnetic field parameter signal; and
a measurement environment parameter acquisition device (80) for acquiring at least one measurement environment parameter in the test object (14),
said evaluation device (42) being configured to generate the measurement signal corrected based on said at least one measurement environment parameter acquired by the measurement environment parameter acquisition device (80),
characterized in that the measurement environment parameter acquisition device (80) comprises:
an acceleration sensor (82) for detecting an acceleration applied to the sensor head (10) and/or to the test object (14).

2. The load measurement device according to claim 1, characterized in that the evaluation device (42) is configured to:
detect shocks or dynamic loads from outside on the basis of the acceleration detected by the acceleration sensor (82) and to correct the measurement signal on the basis of that.

3. The load measurement device according to claim 1, characterized in that the measurement environment parameter acquisition device (80) comprises:
at least one magnetic sensor (86) for detecting a static magnetic field or a magnetic field that changes at a lower frequency compared to the periodically generated magnetic field, and/or
at least one temperature sensor (84) for detecting the temperature of the test object,
wherein the evaluation device (42) is configured to:
detect a change in ambient magnetic fields on the basis of a magnetic sensor signal of the magnetic sensor (86) and to correct the measurement signal on the basis of this change in the ambient magnetic fields; and/or
correct the measurement signal on the basis of the temperature of the test object (14) measured by the temperature sensor (84).

4. The load measurement device according to any of the preceding claims, characterized in that a first pair (A1, B1) of a first magnetic field sensor (26-1) and second magnetic field sensor (26-2), and a second pair (A2, B2) of a second magnetic field sensor (26-1) and a second magnetic field sensor (26-2) are provided, the first and the second magnetic field sensors (26-1, 26-2) being provided in an X-shaped arrangement in such a manner that the first magnetic field sensors (26-1) are opposite each other and the second magnetic field sensors (26-2) are opposite each other, wherein each of the magnetic field sensors (26-1, 26-2) is associated with an analog-digital converter (44a, 44b, 44c, 44d) so that a first to fourth digital magnetic field detection signal are supplied to the evaluation device (42), wherein the evaluation device (42) is configured to produce therefrom a first measurement signal and a different second measurement signal.

5. The load measurement device according to claim 4, characterized in that the evaluation device (42) is configured to evaluate the first pair (A1, B1) and the second pair (A2, B2) separately to produce the first and the second measurement signal.

6. The load measurement device according to claim 5, characterized in that the evaluation device (42) is configured to evaluate the first pair by measuring a difference of the signals of its magnetic field sensors (26-1, 26-2) and by measuring the signal of the first magnetic field sensor (26-1) of the first pair and to evaluate the second pair by measuring a difference of the signals of its magnetic field sensors (26-1, 26-2) and by measuring the signal of the first magnetic field sensor (26-1) of the second pair.

7. The load measurement device according to claim 1, characterized in that the sensor head (10) comprises a shield (60) against electromagnetic interference in the environment.

8. A load measurement arrangement (16), comprising a test object (14) and the load measurement device (12) according to claim 1 for non-contact load measurement in the test object (14).

9. The load measurement arrangement according to claim 8, characterized in that several sensor heads (10) are disposed in diametrically opposed positions on the test object and/or annularly around the test object.

10. The load measurement arrangement according to claim 8 or 9, characterized in that the test object has a cavity at least one measuring area, the at least one sensor head being arranged in said cavity, surrounded by the test object.

11. The load measurement device according to claim 1, wherein the measurement environment parameter acquisition device (80) further comprises:
    a temperature sensor (84) for detecting a temperature difference between the test object and the sensor head.

12. The load measurement device according to claim 11, wherein the evaluation device (42) is configured to correct the measurement signal on the basis of the temperature difference between the test object (14) and the sensor head (10) or a sensor housing measured by the temperature sensor (84).

13. The load measurement device according to claim 1, wherein the measurement environment parameter acquisition device (80) further comprises:
    a current sensor (88) for detecting the amperage of the current flowing in the magnetic field generating coil (Lg), wherein the evaluation unit is configured to detect a change in the inductance of the magnetic field generating coil (Lg) on the basis of a change in the amperage measured by the current sensor (88) and/or a change in the permeability of the test object (14) and to correct the measurement signal on the basis of the change in the amperage measured by the current sensor (88);
    and/or an inductance sensor (90) for detecting the inductance of the magnetic field generating coil (Lg).

14. The load measurement device according to claim 13, characterized in that the evaluation device (42) is configured to:
    correct the measurement signal on the basis of a change in the inductance of the magnetic field generating coil (Lg) measured by the inductance sensor (90); and/or
    detect a change in the permeability of the test object (14) on the basis of a change in the inductance of the magnetic field generating coil (Lg) measured by the inductance sensor (90) and to correct the measurement signal on the basis of this change.

* * * * *